Oct. 22, 1968 R. W. DURIE 3,407,003
METHOD OF RECOVERING HYDROCARBONS FROM AN UNDERGROUND
HYDROCARBON-CONTAINING SHALE FORMATION
Filed Sept. 29, 1966

INVENTOR:
ROBERT W. DURIE
BY: George G. Pritzker
HIS AGENT

United States Patent Office 3,407,003
Patented Oct. 22, 1968

3,407,003
METHOD OF RECOVERING HYDROCARBONS FROM AN UNDERGROUND HYDROCARBON-CONTAINING SHALE FORMATION
Robert W. Durie, Ottawa, Ontario, Canada, assignor to Shell Oil Company, New York, N.Y., a corporation of Delaware
Filed Sept. 29, 1966, Ser. No. 582,980
Claims priority, application Canada, Jan. 17, 1966, 950,056
3 Claims. (Cl. 299—4)

ABSTRACT OF THE DISCLOSURE

A method of recovering hydrocarbons from an underground hydrocarbon-containing bentonitic shale formation penetrated by wells by injecting an aqueous liquid into the formation via one well to swell and disintegrate the formation so as to form a slurry and recovering the hydrocarbon from the slurry above ground via another well, the two wells being in communication by a fracture.

---

Figure 1:
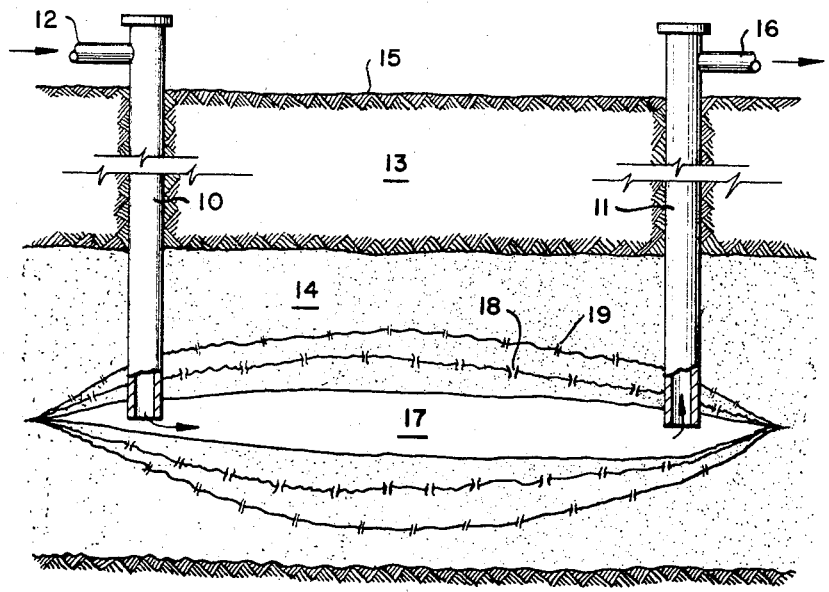

The present invention relates to a method of recovering hydrocarbon from an underground hydrocarbon-containing bentonitic shale formation.

Shale formations containing hydrocarbons of very high viscosity (so called kerogen) occur over great areas and contain large amounts of valuable hydrocarbon material. The problems of recovering such hydrocarbon material from the shale economically have previously not been solved.

Until now, bentonitic hydrocarbon-containing shales are, depending on the depth at which they are located, either excavated and subsequently processed in suitable equipment to separate the clay material from the hydrocarbon material, or are processed in situ by applying heat treatments to the formation so as to crack the hydrocarbon material into components less viscous than the original material. In the latter type of process, the heat applied also decreases the viscosity of these components which are then sufficiently mobile to flow to the production well or wells from which they are recovered. In the introduction of heat exchange media such as hot liquids or gases, or heat generators such as gases which will react exothermically with the hydrocarbon material one encounters serious problems, however, since the shales are nearly impermeable. Although the permeability of the formation may be increased by fracturing, this only slightly improves the contact of the fluids with the parts of the formation to be treated. Consequently, the rate of heat transfer between the fluids and the formation is extremely small, which makes the in situ processing methods very inefficient.

It has now been found that with bentonitic hydrocarbon-containing shales, namely those having a substantially bentonitic clay base material may be treated economically for the recovery of hydrocarbon in a new, novel and very effective manner.

According to the invention, the method for recovering hydrocarbon from hydrocarbon-containing bentonitic shales comprises the step of contacting the hydrocarbon-containing bentonitic shale with an aqueous liquid to cause the shale to swell and disintegrate, whereafter the aqueous slurry of swollen bentonitic clay and hydrocarbon is recovered and the hydrocarbon separated therefrom.

The method according to the invention may be applied with the same success in shallow hydrocarbon-containing bentonitic shale formations, which may even outcrop, as in deep hydrocarbon-containing bentonitic shale formations. The method may furthermore be applied to quantities of hydrocarbon-containing bentonitic shales which have been mined from subsurface or outcrop formations.

The present method will now, by way of example, be described with reference to the drawing represented by FIGURES 1 and 2, which show schematically a vertical section of part of the earth's crust where a hydrocarbon-containing bentonitic shale formation underlies a formation containing no hydrocarbons.

In FIGURE 1 wells 10 and 11 respectively, penetrate formation 13 overlying the hydrocarbon-containing bentonitic shale formation 14 which may be located at such a depth that excavating of the material for surface treatment is impracticable. Wells 10 and 11 both penetrate into the shale formation 14 and extend to near the lowermost level of this formation.

The wells are drilled and completed in a manner known per se. For the sake of simplicity all the details (such as casing, tubing, wellhead, cementing layer, liner) are not shown in the drawing, nor are they further described in the specification. One of the wells, in this case well 10, is designed as an injection well for injecting an aqueous liquid through tube 15. The other well 11 is designed as a production well, and serves to transport the aqueous slurry of hydrocarbon-carrying bentonitic clay to the surface 15 as it is pumped up through well 11 and through pipe 16 to a processing plant not shown.

At least one of the wells is suitable for injecting a fracture medium for creating a fracture 17 which provides a communication between the wells 10 and 11 through the formation 14. Fracture 17 is preferably located in the lower part of the formation 14. The invention is not limited to the use of fractures of the horizontal type as shown in the drawing, but may also be applied in a formation wherein the fracture is of the vertical type. Fracture media are well known and not described here in detail. Since, however, the aqueous liquid which is employed for recovering the hydrocarbon-containing bentonitic shale exhibits excellent fracturing properties for such shale formations, it is preferred to fracture the formation with the aqueous liquid, e.g., water and start the recovery process by continuing the injection of water after the fracture has been formed.

While water itself may, as described above, be used as the aqueous liquid, other materials, such as surface active agents may be added to the water and these may be ionic, anionic and/or cationic. If desired, the bentonitic clay material from which hydrocarbons have been extracted may be re-slurried with water and injected into the formation through well 10 as a means of disposal of this waste product.

The temperature of the injected water or other aqueous liquid is preferably, but not necessarily, the same as that of the temperature of the shale formation 14.

The hydrocarbon-containing bentonitic shale, swollen and disintegrated by the action of the water flowing through the fracture 17, forms a slurry with the water which raised to the surface through production well 11. The slurry is then passed to suitable separating equipment for recovering the hydrocarbon material from the bentonitic clay.

By passage of the aqueous liquid through the fracture 17, the latter grows in size to form a cavity as indicated schematically by the successive boundaries 18 and 19. Quantities of shale falling from the roof of the fracture or cavity normally create no problem, since such material is swollen and disintegrated by the water and swept on as a slurry. However, if amounts of shale falling into the cavity are so great that the passage of the aqueous liquid between the wells 10 and 11 is prevented, a new fracture has to be created.

Figure 2:
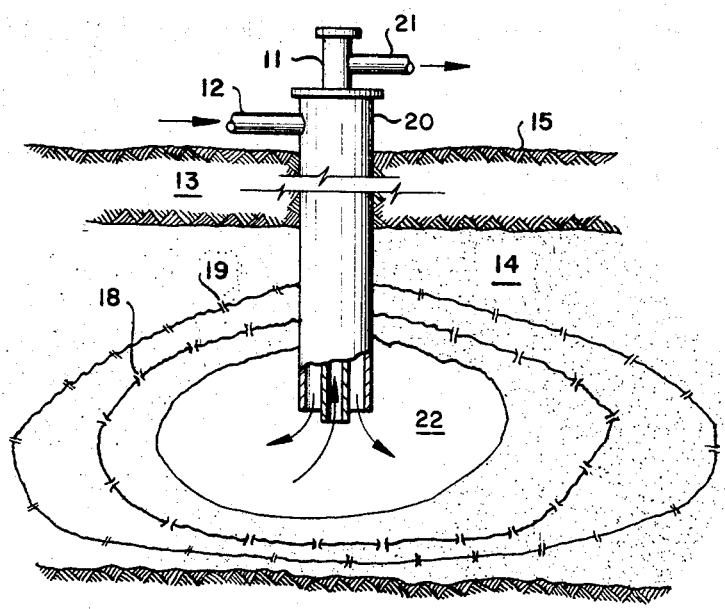

In an alternative embodiment of the invention, the introduction of water and the recovery of the slurry may take place through a single well penetrating into the formation 14 as shown in FIGURE 2. In this embodiment, water is first pumped into the well formation through tubing 12 of casing 20 and into formation 14. This prewater has disintegrated the shale in the immediate surroundings of the well, the slurry thus formed is pumped out through tube string 21. This removal of slurry leaves a cavity 22 around bottom of the well which is subsequently filled with a fresh batch of water. This cycle is repeated as required. This embodiment of the invention may also be carried out continuously by providing two separate ducts, concentric or otherwise arranged, within the single well.

As already mentioned, the method of the invention may also be applied in recovering hydrocarbons from shale formations which are located at shallow depths. For instance, if the hydrocarbon-containing bentonitic shale is covered by a formation containing no hydrocarbon, the latter may be removed by excavating, and water is pumped into the pit thus formed. The bentonitic shale swells and sloughs off under action of the water. Preferably a continuous process is used, in which water is pumped into the pit at one side thereof, and the slurry formed by the water and the swollen clay particles and hydrocarbon is pumped out of the pit at the opposite side of the pit. Jetting the water onto the bottom and side walls of the pit will greatly improve the speed at which the slurry is formed.

The method according to the invention may also be applied to already mined bentonitic shales containing hydrocarbons. Water may be brought into contact with the mined shale in any manner, but it is preferred to jet the water into the shale. Since the shale forms a slurry with the water, the high cost of mechanically crushing the shale is thereby avoided. Upon recovery of the slurry of bentonitic shale dispersed in a water phase, the shale may be recovered therefrom mechanically, e.g., by filtering, decanting or centrifuging from the water phase. The shale can be further dried by application of heat and air convection, and the hydrocarbon can be separated from the dry shale by known separation methods. Alternatively, the shale slurry may pass directly to a distillation and retorting phase. The energy required to distill off the water phase would be derived through the application of conventional heat exchanger facilities.

Although in the example described with reference to the drawing only two wells have been shown penetrating into the formation 14, it will be obvious that the invention is not limited thereto, but that the method may be applied with similar results by using more wells, particularly production wells, which wells may be arranged in any pattern suitable for the purpose.

I claim as my invention:

1. A method for recovering hydrocarbon from an underground hydrocarbon-containing bentonitic shale formation which comprises the following steps:
    (a) drilling and completing at least two wells into the formation, which wells penetrate the formation near the lower part thereof,
    (b) injecting an aqueous liquid under conditions to fracture the formation and create a fracture extending between the wells,
    (c) injecting an aqueous liquid into the fractured portion of the formation via one of the wells under conditions to swell and disintegrate this portion of the formation and form an aqueous-hydrocarbon shale slurry,
    (d) removing the aqueous slurry of swollen bentonitic shale-carrying hydrocarbon so formed via the other well, and
    (e) separating hydrocarbon from the slurry.

2. Method according to claim 1, wherein the fracturing liquid as applied in step (b) is the same as the liquid as applied in step (c).

3. Method of claim 1 wherein the aqueous liquid is water containing a surfactant.

References Cited

UNITED STATES PATENTS

| | | | |
|---|---|---|---|
| 823,749 | 6/1906 | Wanner | 299—17 |
| 1,612,611 | 12/1926 | Claytor | 299—17 X |
| 2,561,639 | 7/1951 | Squires | 299—17 X |
| 2,847,202 | 8/1958 | Pullen | 299—4 |
| 2,983,103 | 5/1961 | Teichmann et al. | 299—5 X |
| 3,159,562 | 12/1964 | Bichard et al. | 208—11 |
| 3,273,640 | 9/1966 | Huntington | 166—7 |

FOREIGN PATENTS

| | | |
|---|---|---|
| 163,519 | 5/1921 | Great Britain. |

CHARLES E. O'CONNELL, *Primary Examiner.*

I. A. CALVERT, *Assistant Examiner.*